(12) United States Patent
Mazzaferro et al.

(10) Patent No.: US 10,844,669 B2
(45) Date of Patent: Nov. 24, 2020

(54) THREADED JOINT SEALED TO INTERNAL AND EXTERNAL PRESSURES

(75) Inventors: Gaston Mazzaferro, Buenos Aires (AR); Gabriel E. Carcagno, Buenos Aires (AR); Tatsuo Ono, Buenos Aires (AR); Nestor J. Santi, Buenos Aires (AR)

(73) Assignee: TENARIS CONNECTIONS B.V., Amsterdam (NL)

( * ) Notice: Subject to any disclaimer, the term of this patent is extended or adjusted under 35 U.S.C. 154(b) by 818 days.

(21) Appl. No.: 12/954,588

(22) Filed: Nov. 24, 2010

(65) Prior Publication Data

US 2011/0133449 A1 Jun. 9, 2011

(30) Foreign Application Priority Data

Nov. 24, 2009 (EP) ..................................... 09176859

(51) Int. Cl.
*E21B 17/042* (2006.01)
*F16L 15/00* (2006.01)

(52) U.S. Cl.
CPC .......... *E21B 17/042* (2013.01); *F16L 15/004* (2013.01)

(58) Field of Classification Search
USPC .................. 285/333, 334, 355, 390
See application file for complete search history.

(56) References Cited

U.S. PATENT DOCUMENTS

| 1,590,357 A | 6/1926 | Feisthamel |
| 1,671,458 A | 5/1928 | Wilson |
| 1,799,762 A | 1/1929 | Rathbun |
| 1,999,706 A | 4/1935 | Spang |
| 2,075,427 A | 3/1937 | Church |
| 2,211,173 A | 8/1940 | Shaffer |
| 2,636,753 A | 4/1948 | Griffin |
| 2,487,241 A | 11/1949 | Hilton |

(Continued)

FOREIGN PATENT DOCUMENTS

| AT | 388791 | 8/1989 |
| CA | 2319926 | 7/2008 |

(Continued)

OTHER PUBLICATIONS

Chang, L.C., "Microstructures and reaction kinetics of bainite transformation in Si-rich steels," XP0024874, Materials Science and Engineering, vol. 368, No. 1-2, Mar. 15, 2004, pp. 175-182, Abstract, Table 1.

(Continued)

*Primary Examiner* — James M Hewitt, II
(74) *Attorney, Agent, or Firm* — Knobbe, Martens, Olson & Bear, LLP (57) ABSTRACT

A threaded joint for joining tubes used especially in the field of OCTG (Oil Country Tubular Goods), such as pipes in gas or oil production and/or casings when drilling wells can include a pin and a coupling, or box, having an end surface not facing against any surface of the pin when the joint is made-up. Following make-up of the joint, first sealing surfaces of the pin and box mate to form an internal metal-to-metal seal, and second sealing surfaces of the pin and box mate to form an external metal-to-metal seal, where the internal and external seals are defined by contact between one toroidal surface and one frusto-conical surface.

21 Claims, 2 Drawing Sheets

(56) References Cited

U.S. PATENT DOCUMENTS

| | | |
|---|---|---|
| 2,539,057 A | 1/1951 | Brown |
| 2,567,113 A | 9/1951 | Kristensen |
| 2,631,871 A | 3/1953 | Stone |
| 2,634,943 A | 4/1953 | Gulick |
| 2,841,429 A | 10/1955 | McCuistion |
| 2,766,998 A | 10/1956 | Watts et al. |
| 2,916,306 A | 12/1959 | Rickard |
| 2,992,021 A * | 7/1961 | Nay .................. 285/334 |
| 2,992,613 A | 7/1961 | Bodine |
| 3,016,250 A | 1/1962 | Franck |
| 3,041,088 A | 6/1962 | Brandon |
| 3,054,628 A | 9/1962 | Hardy et al. |
| 3,150,889 A | 9/1964 | Watts |
| 3,219,354 A | 11/1965 | Kazienko |
| 3,266,824 A | 8/1966 | Nealy |
| 3,307,860 A | 3/1967 | Blount et al. |
| 3,316,395 A | 4/1967 | Lavin |
| 3,316,396 A | 4/1967 | Lavin |
| 3,325,174 A | 6/1967 | Weaver |
| 3,362,731 A | 1/1968 | Gasche et al. |
| 3,366,392 A | 1/1968 | Kennel |
| 3,413,166 A | 11/1968 | Zackay et al. |
| 3,489,437 A | 1/1970 | Duret |
| 3,512,789 A | 5/1970 | Tanner |
| 3,552,781 A | 1/1971 | Helland |
| 3,572,777 A | 3/1971 | Blose et al. |
| 3,575,430 A | 4/1971 | Alpine |
| 3,592,491 A | 7/1971 | Glover |
| 3,599,931 A | 8/1971 | Hanson |
| 3,655,465 A | 4/1972 | Snape et al. |
| 3,733,093 A | 5/1973 | Seiler |
| 3,810,793 A | 5/1974 | Heller |
| 3,854,760 A | 12/1974 | Duret |
| 3,889,989 A | 6/1975 | Legris et al. |
| 3,891,224 A | 6/1975 | Ditcher |
| 3,893,919 A | 7/1975 | Flegel et al. |
| 3,915,697 A | 10/1975 | Giuliani et al. |
| 3,918,726 A | 11/1975 | Kramer |
| 3,986,731 A | 10/1976 | DeHoff |
| 4,014,568 A | 3/1977 | Carter et al. |
| 4,147,368 A | 4/1979 | Baker et al. |
| 4,163,290 A | 7/1979 | Sutherlin et al. |
| 4,219,204 A | 8/1980 | Pippert |
| 4,231,555 A | 11/1980 | Saito |
| 4,299,412 A | 10/1981 | Parmann |
| 4,305,059 A | 12/1981 | Benton |
| 4,310,163 A | 1/1982 | Pippert |
| 4,336,081 A | 6/1982 | Hijikata et al. |
| 4,345,739 A | 8/1982 | Wheatley |
| 4,354,882 A | 10/1982 | Greer |
| 4,366,971 A | 1/1983 | Lula |
| 4,368,894 A | 1/1983 | Parmann |
| 4,373,750 A | 2/1983 | Mantelle et al. |
| 4,376,528 A | 3/1983 | Ohshimatani et al. |
| 4,379,482 A | 4/1983 | Suzuki et al. |
| 4,384,737 A | 5/1983 | Reusser |
| 4,406,561 A | 9/1983 | Ewing |
| 4,407,681 A | 10/1983 | Ina et al. |
| 4,426,095 A | 1/1984 | Buttner |
| 4,445,265 A | 5/1984 | Olson et al. |
| 4,473,471 A | 9/1984 | Robichaud et al. |
| 4,475,839 A | 10/1984 | Strandberg |
| 4,491,725 A | 1/1985 | Pritchard |
| 4,506,432 A | 3/1985 | Smith |
| 4,526,628 A | 7/1985 | Ohno et al. |
| 4,527,815 A | 7/1985 | Smith |
| 4,564,392 A | 1/1986 | Ohhashi et al. |
| 4,570,982 A | 2/1986 | Blose et al. |
| 4,591,195 A | 5/1986 | Chelette et al. |
| 4,592,558 A | 6/1986 | Hopkins |
| 4,601,491 A * | 7/1986 | Bell et al. .................. 285/24 |
| 4,602,807 A | 7/1986 | Bowers |
| 4,623,173 A | 11/1986 | Handa et al. |
| 4,629,218 A | 12/1986 | Dubois |
| 4,662,659 A | 5/1987 | Blose et al. |
| 4,674,756 A | 6/1987 | Fallon et al. |
| 4,688,832 A | 8/1987 | Ortloff et al. |
| 4,706,997 A | 11/1987 | Carstensen |
| 4,710,245 A | 12/1987 | Roether |
| 4,721,536 A | 1/1988 | Koch et al. |
| 4,758,025 A | 7/1988 | Frick |
| 4,762,344 A | 8/1988 | Perkins et al. |
| 4,812,182 A | 3/1989 | Fang et al. |
| 4,814,141 A | 3/1989 | Imai et al. |
| 4,844,517 A | 7/1989 | Beiley et al. |
| 4,856,828 A | 8/1989 | Kessler et al. |
| 4,955,645 A | 9/1990 | Weems |
| 4,958,862 A | 9/1990 | Cappelli et al. |
| 4,988,127 A | 1/1991 | Cartensen |
| 5,007,665 A | 4/1991 | Bovisio et al. |
| 5,067,874 A | 11/1991 | Foote |
| 5,137,310 A | 8/1992 | Noel et al. |
| 5,143,381 A | 9/1992 | Temple |
| 5,154,534 A | 10/1992 | Guerin et al. |
| 5,180,008 A | 1/1993 | Aldridge et al. |
| 5,191,911 A | 3/1993 | Dubois |
| 5,242,199 A | 9/1993 | Hann et al. |
| 5,328,158 A | 7/1994 | Lewis et al. |
| 5,348,350 A | 9/1994 | Blose et al. |
| 5,352,406 A | 10/1994 | Barteri et al. |
| 5,360,239 A | 11/1994 | Klementich |
| 5,454,883 A | 10/1995 | Yoshie et al. |
| 5,505,502 A * | 4/1996 | Smith et al. .................. 285/334 |
| 5,515,707 A | 5/1996 | Smith |
| 5,538,566 A | 7/1996 | Gallagher |
| 5,592,988 A | 1/1997 | Meroni et al. |
| 5,598,735 A | 2/1997 | Saito et al. |
| 5,653,452 A | 8/1997 | Järvenkylä |
| 5,712,706 A | 1/1998 | Castore et al. |
| 5,794,985 A | 8/1998 | Mallis |
| 5,810,401 A | 9/1998 | Mosing et al. |
| 5,860,680 A | 1/1999 | Drijver et al. |
| 5,879,030 A | 3/1999 | Clayson et al. |
| 5,879,474 A | 3/1999 | Bhadeshia et al. |
| 5,944,921 A | 8/1999 | Cumino et al. |
| 5,993,570 A | 11/1999 | Gray |
| 6,006,789 A | 12/1999 | Toyooka et al. |
| 6,030,470 A | 2/2000 | Hensger et al. |
| 6,044,539 A | 4/2000 | Guzowksi |
| 6,045,165 A | 4/2000 | Sugino et al. |
| 6,056,324 A * | 5/2000 | Reimert et al. .................. 285/18 |
| 6,070,912 A | 6/2000 | Latham |
| 6,173,968 B1 | 1/2001 | Nelson et al. |
| 6,188,037 B1 | 2/2001 | Hamada et al. |
| 6,196,530 B1 | 3/2001 | Muhr et al. |
| 6,217,676 B1 | 4/2001 | Takabe et al. |
| 6,248,187 B1 | 6/2001 | Asahi et al. |
| 6,257,056 B1 | 7/2001 | Shibayama et al. |
| 6,267,828 B1 | 7/2001 | Kushida et al. |
| 6,311,965 B1 | 11/2001 | Muhr et al. |
| 6,331,216 B1 | 12/2001 | Toyooka et al. |
| 6,347,814 B1 * | 2/2002 | Cerruti .................. 285/334 |
| 6,349,979 B1 | 2/2002 | Noel et al. |
| 6,384,388 B1 | 5/2002 | Anderson et al. |
| 6,412,831 B1 | 7/2002 | Noel et al. |
| 6,447,025 B1 | 9/2002 | Smith |
| 6,478,344 B2 * | 11/2002 | Pallini et al. .................. 285/333 |
| 6,481,760 B1 | 11/2002 | Noel et al. |
| 6,494,499 B1 * | 12/2002 | Galle et al. .................. 285/334 |
| 6,514,359 B2 | 2/2003 | Kawano |
| 6,527,056 B2 | 3/2003 | Newman |
| 6,550,822 B2 | 4/2003 | Mannella et al. |
| 6,557,906 B1 | 5/2003 | Carcagno |
| 6,558,484 B1 | 5/2003 | Onoe et al. |
| 6,581,940 B2 | 6/2003 | Dittel |
| 6,632,296 B2 | 10/2003 | Yoshinaga et al. |
| 6,648,991 B2 | 11/2003 | Turconi et al. |
| 6,669,285 B1 | 12/2003 | Park et al. |
| 6,669,789 B1 | 12/2003 | Edelman et al. |
| 6,682,610 B1 | 1/2004 | Inoue |
| 6,683,834 B2 | 1/2004 | Ohara et al. |
| 6,709,534 B2 | 3/2004 | Kusinski et al. |
| 6,752,436 B1 | 6/2004 | Verdillon |
| 6,755,447 B2 | 6/2004 | Galle, Jr. et al. |

(56) References Cited

U.S. PATENT DOCUMENTS

| | | | |
|---|---|---|---|
| 6,764,108 B2 | 7/2004 | Ernst et al. | |
| 6,767,417 B2 | 7/2004 | Fujita et al. | |
| 6,814,358 B2 | 11/2004 | Keck | |
| 6,851,727 B2 | 2/2005 | Carcagno et al. | |
| 6,857,668 B2 | 2/2005 | Otten et al. | |
| 6,883,804 B2 | 4/2005 | Cobb | |
| 6,905,150 B2 | 6/2005 | Carcagno et al. | |
| 6,921,110 B2 | 7/2005 | Morotti et al. | |
| 6,958,099 B2 | 10/2005 | Nakamura et al. | |
| 6,971,681 B2 * | 12/2005 | Dell'Erba et al. | 285/55 |
| 6,991,267 B2 | 1/2006 | Ernst et al. | |
| 7,014,223 B2 | 3/2006 | Della Pina et al. | |
| 7,066,499 B2 | 6/2006 | Della Pina et al. | |
| 7,074,283 B2 | 7/2006 | Omura | |
| 7,083,686 B2 | 8/2006 | Itou | |
| 7,108,063 B2 | 9/2006 | Carstensen | |
| 7,118,637 B2 | 10/2006 | Kusinski et al. | |
| 7,182,140 B2 | 2/2007 | Wood | |
| 7,214,278 B2 | 5/2007 | Kusinski et al. | |
| 7,255,374 B2 * | 8/2007 | Carcagno et al. | 285/333 |
| 7,264,684 B2 | 9/2007 | Numata et al. | |
| 7,284,770 B2 | 10/2007 | Dell'erba et al. | |
| 7,310,867 B2 | 12/2007 | Corbett, Jr. | |
| 7,431,347 B2 | 10/2008 | Ernst et al. | |
| 7,464,449 B2 | 12/2008 | Santi et al. | |
| 7,475,476 B2 | 1/2009 | Roussie | |
| 7,478,842 B2 | 1/2009 | Reynolds, Jr. et al. | |
| 7,506,900 B2 | 3/2009 | Carcagno et al. | |
| 7,621,034 B2 | 11/2009 | Roussie | |
| 7,635,406 B2 | 12/2009 | Numata et al. | |
| 7,735,879 B2 | 6/2010 | Toscano et al. | |
| 7,744,708 B2 | 6/2010 | López et al. | |
| 7,752,416 B2 | 7/2010 | Mazzaferro et al. | |
| 7,753,416 B2 | 7/2010 | Mazzaferro et al. | |
| 7,862,667 B2 | 1/2011 | Turconi et al. | |
| 8,002,910 B2 | 8/2011 | Tivelli et al. | |
| 8,007,601 B2 | 8/2011 | López et al. | |
| 8,007,603 B2 | 8/2011 | Garcia et al. | |
| 8,016,362 B2 | 9/2011 | Itoga | |
| 8,215,680 B2 | 7/2012 | Nestor | |
| 8,262,094 B2 | 9/2012 | Beele | |
| 8,262,140 B2 | 9/2012 | Santi et al. | |
| 8,317,946 B2 | 11/2012 | Arai et al. | |
| 8,328,958 B2 | 12/2012 | Turconi et al. | |
| 8,333,409 B2 | 12/2012 | Santi et al. | |
| 8,414,715 B2 | 4/2013 | Altschuler et al. | |
| 8,544,304 B2 | 10/2013 | Nestor | |
| 8,636,856 B2 | 1/2014 | Altschuler et al. | |
| 8,821,653 B2 | 9/2014 | Anelli et al. | |
| 8,840,152 B2 | 9/2014 | Carcagno et al. | |
| 8,926,771 B2 | 1/2015 | Agazzi | |
| 9,004,544 B2 | 4/2015 | Carcagno et al. | |
| 9,163,296 B2 | 10/2015 | Valdez et al. | |
| 9,187,811 B2 | 11/2015 | Gomez et al. | |
| 9,188,252 B2 | 11/2015 | Altschuler et al. | |
| 9,222,156 B2 | 12/2015 | Altschuler et al. | |
| 9,383,045 B2 | 7/2016 | Santi et al. | |
| 2001/0035235 A1 | 11/2001 | Kawano | |
| 2002/0011284 A1 | 1/2002 | Von Hagen et al. | |
| 2002/0153671 A1 | 10/2002 | Raymond et al. | |
| 2002/0158469 A1 | 10/2002 | Mannella et al. | |
| 2003/0019549 A1 | 1/2003 | Turconi et al. | |
| 2003/0111146 A1 | 6/2003 | Kusinski et al. | |
| 2003/0116238 A1 | 6/2003 | Fujita | |
| 2003/0155052 A1 | 8/2003 | Kondo et al. | |
| 2003/0165098 A1 | 9/2003 | Ohara et al. | |
| 2003/0168859 A1 | 9/2003 | Watts | |
| 2004/0118490 A1 | 6/2004 | Klueh et al. | |
| 2004/0118569 A1 | 6/2004 | Brill et al. | |
| 2004/0131876 A1 | 7/2004 | Ohgami et al. | |
| 2004/0139780 A1 | 7/2004 | Cai et al. | |
| 2004/0151608 A1 | 8/2004 | Vogt et al. | |
| 2004/0195835 A1 | 10/2004 | Noel et al. | |
| 2004/0262919 A1 * | 12/2004 | Dutilleul et al. | 285/333 |
| 2005/0012278 A1 | 1/2005 | Delange | |
| 2005/0076975 A1 | 4/2005 | Lopez et al. | |
| 2005/0087269 A1 | 4/2005 | Merwin | |
| 2005/0093250 A1 | 5/2005 | Santi et al. | |
| 2005/0166986 A1 | 8/2005 | Dell'erba et al. | |
| 2006/0006600 A1 | 1/2006 | Roussie | |
| 2006/0124211 A1 | 6/2006 | Takano et al. | |
| 2006/0137781 A1 | 6/2006 | Kusinski et al. | |
| 2006/0169368 A1 | 8/2006 | Lopez et al. | |
| 2006/0231168 A1 | 10/2006 | Nakamura et al. | |
| 2006/0243355 A1 | 11/2006 | Haiderer et al. | |
| 2006/0273586 A1 | 12/2006 | Reynolds, Jr. et al. | |
| 2007/0039147 A1 | 2/2007 | Roussie | |
| 2007/0039149 A1 | 2/2007 | Roussie | |
| 2007/0089813 A1 | 4/2007 | Tivelli | |
| 2007/0137736 A1 | 6/2007 | Omura et al. | |
| 2007/0200345 A1 | 8/2007 | Toscano et al. | |
| 2007/0216126 A1 | 9/2007 | Lopez et al. | |
| 2007/0246219 A1 | 10/2007 | Manella et al. | |
| 2008/0047635 A1 | 2/2008 | Konda et al. | |
| 2008/0115863 A1 | 5/2008 | McCrink et al. | |
| 2008/0129044 A1 | 6/2008 | Carcagno et al. | |
| 2008/0219878 A1 | 9/2008 | Konda et al. | |
| 2008/0226396 A1 | 9/2008 | Garcia et al. | |
| 2008/0226491 A1 | 9/2008 | Satou et al. | |
| 2008/0264129 A1 | 10/2008 | Cheppe et al. | |
| 2008/0303274 A1 | 12/2008 | Mazzaferro et al. | |
| 2008/0314481 A1 | 12/2008 | Garcia et al. | |
| 2009/0010794 A1 | 1/2009 | Turconi et al. | |
| 2009/0033087 A1 | 2/2009 | Carcagno et al. | |
| 2009/0047166 A1 | 2/2009 | Tomomatsu et al. | |
| 2009/0101242 A1 | 4/2009 | Lopez et al. | |
| 2010/0136363 A1 | 6/2010 | Valdez et al. | |
| 2010/0181727 A1 | 7/2010 | Santi et al. | |
| 2010/0181761 A1 | 7/2010 | Santi et al. | |
| 2010/0187808 A1 | 7/2010 | Santi | |
| 2010/0193085 A1 | 8/2010 | Garcia | |
| 2010/0206553 A1 | 8/2010 | Bailey | |
| 2010/0294401 A1 | 11/2010 | Gomez | |
| 2010/0319814 A1 | 12/2010 | Perez | |
| 2010/0327550 A1 | 12/2010 | Lopez | |
| 2011/0008101 A1 | 1/2011 | Santi et al. | |
| 2011/0041581 A1 | 2/2011 | Santi | |
| 2011/0042946 A1 | 2/2011 | Santi | |
| 2011/0077089 A1 | 3/2011 | Hirai et al. | |
| 2011/0097235 A1 | 4/2011 | Turconi et al. | |
| 2011/0133449 A1 | 6/2011 | Mazzaferro | |
| 2011/0233925 A1 | 9/2011 | Pina | |
| 2011/0233926 A1 | 9/2011 | Carcagno | |
| 2011/0247733 A1 | 10/2011 | Arai et al. | |
| 2011/0259482 A1 | 10/2011 | Peters et al. | |
| 2011/0284137 A1 | 11/2011 | Kami et al. | |
| 2012/0032435 A1 | 2/2012 | Carcagno | |
| 2012/0199255 A1 | 8/2012 | Anelli | |
| 2012/0204994 A1 | 8/2012 | Anelli | |
| 2012/0211132 A1 | 8/2012 | Altschuler | |
| 2014/0021244 A1 | 1/2014 | DuBois | |
| 2014/0027497 A1 | 1/2014 | Rowland et al. | |
| 2014/0272448 A1 | 9/2014 | Valdez et al. | |
| 2014/0299235 A1 | 10/2014 | Anelli | |
| 2014/0299236 A1 | 10/2014 | Anelli | |
| 2015/0368986 A1 | 12/2015 | Narikawa | |
| 2016/0024625 A1 | 1/2016 | Valdez | |
| 2016/0102856 A1 | 4/2016 | Minami | |

FOREIGN PATENT DOCUMENTS

| | | |
|---|---|---|
| CN | 101480671 | 7/2009 |
| CN | 101542002 | 9/2009 |
| DE | 3310226 A1 | 10/1984 |
| DE | 4446806 | 5/1996 |
| EA | 010037 | 6/2008 |
| EA | 012256 | 8/2009 |
| EP | 0 032 265 | 7/1981 |
| EP | 0 092 815 | 11/1983 |
| EP | 0 104 720 | 4/1984 |
| EP | 0 159 385 | 10/1985 |
| EP | 0 309 179 | 3/1989 |
| EP | 0309179 | 3/1989 |
| EP | 0 340 385 | 11/1989 |

(56) References Cited

FOREIGN PATENT DOCUMENTS

| | | |
|---|---|---|
| EP | 0329990 | 11/1992 |
| EP | 0 658 632 | 6/1995 |
| EP | 0 788 850 | 8/1997 |
| EP | 0 828 007 | 3/1998 |
| EP | 0 989 196 | 3/2000 |
| EP | 1 008 660 | 6/2000 |
| EP | 01027944 | 8/2000 |
| EP | 1 065 423 | 1/2001 |
| EP | 1065423 | 1/2001 |
| EP | 1 277 848 | 1/2003 |
| EP | 1 288 316 | 3/2003 |
| EP | 1 296 088 | 3/2003 |
| EP | 1 362977 | 11/2003 |
| EP | 1 413 639 | 4/2004 |
| EP | 1 705 415 | 9/2006 |
| EP | 1 717 324 | 11/2006 |
| EP | 1 726 861 | 11/2006 |
| EP | 1 914 324 | 4/2008 |
| EP | 1554518 B1 | 1/2009 |
| EP | 2 028 284 | 2/2009 |
| EP | 2 133 442 | 12/2009 |
| EP | 2 216 576 | 8/2010 |
| EP | 2 239 343 | 10/2010 |
| EP | 2 325 435 | 10/2012 |
| FR | 1 149 513 A | 12/1957 |
| FR | 2 704 042 A | 10/1994 |
| FR | 2 848 282 A1 | 6/2004 |
| FR | 2855587 | 12/2004 |
| GB | 498 472 | 1/1939 |
| GB | 1 398 214 | 6/1973 |
| GB | 1 428 433 | 3/1976 |
| GB | 2 104 919 A | 3/1983 |
| GB | 2 234 308 A | 1/1991 |
| GB | 2 276 647 | 10/1994 |
| GB | 2 388 169 A | 11/2003 |
| JP | S60 116796 A | 6/1985 |
| JP | 60-215719 A | 10/1985 |
| JP | 36025719 | 10/1985 |
| JP | 01 259124 A2 | 10/1989 |
| JP | 01 283322 A2 | 11/1989 |
| JP | 05-098350 | 12/1990 |
| JP | 403006329 A | 1/1991 |
| JP | 04 021718 A2 | 1/1992 |
| JP | 04 107214 | 4/1992 |
| JP | 04 231414 A2 | 8/1992 |
| JP | 05 287381 A2 | 11/1993 |
| JP | H06-042645 | 2/1994 |
| JP | 06-093339 | 4/1994 |
| JP | 06 172859 A2 | 6/1994 |
| JP | 06-220536 | 8/1994 |
| JP | 07 041856 A2 | 2/1995 |
| JP | 07-139666 | 5/1995 |
| JP | 07 197125 A2 | 8/1995 |
| JP | 08 311551 | 11/1996 |
| JP | 09 067624 A2 | 3/1997 |
| JP | 09-235617 | 9/1997 |
| JP | 10 140250 | 5/1998 |
| JP | 10176239 | 6/1998 |
| JP | 10 280037 A | 10/1998 |
| JP | 11 050148 A | 2/1999 |
| JP | 11140580 | 5/1999 |
| JP | 2000-063940 | 2/2000 |
| JP | 2000-178645 | 6/2000 |
| JP | 2000-248337 A | 9/2000 |
| JP | 2001-131698 | 5/2001 |
| KR | 0245031 | 3/2000 |
| UA | 51138 A | 11/2002 |
| WO | WO 1984/002947 | 8/1984 |
| WO | WO 1994/29627 | 12/1994 |
| WO | WO 1996/22396 | 7/1996 |
| WO | WO 2000/06931 | 2/2000 |
| WO | WO 2000/70107 | 11/2000 |
| WO | WO 2001/075345 | 10/2001 |
| WO | WO 2001/88210 | 11/2001 |
| WO | WO 2002/29290 | 4/2002 |
| WO | WO 2002/035128 | 5/2002 |
| WO | WO 2002/068854 | 9/2002 |
| WO | WO 2002/086369 | 10/2002 |
| WO | WO 2002/093045 | 11/2002 |
| WO | WO 2003/033856 | 4/2003 |
| WO | WO 2003/048623 | 6/2003 |
| WO | WO 2003/087646 | 10/2003 |
| WO | WO 2004/023020 | 3/2004 |
| WO | WO 2004/031420 | 4/2004 |
| WO | WO 2004/033951 | 4/2004 |
| WO | WO 2004/053376 | 6/2004 |
| WO | WO 2004/097059 | 11/2004 |
| WO | WO 2004/109173 | 12/2004 |
| WO | WO 2006/087361 | 4/2006 |
| WO | WO 2006/078768 | 7/2006 |
| WO | WO 2007/002576 | 1/2007 |
| WO | WO 2007/017161 | 2/2007 |
| WO | WO 2007017082 A1 * | 2/2007 |
| WO | WO 2007/028443 | 3/2007 |
| WO | WO 2007/034063 | 3/2007 |
| WO | WO 2007/063079 | 6/2007 |
| WO | WO 2008/003000 | 1/2008 |
| WO | WO 2008/090411 | 7/2008 |
| WO | WO 2008/110494 | 9/2008 |
| WO | WO 2008/127084 | 10/2008 |
| WO | WO 2009/000851 | 12/2008 |
| WO | WO 2009/000766 | 1/2009 |
| WO | WO 2009/010507 | 1/2009 |
| WO | WO 2009/027308 | 3/2009 |
| WO | WO 2009/027309 | 3/2009 |
| WO | WO 2009/044297 | 4/2009 |
| WO | WO 2009/065432 | 5/2009 |
| WO | WO 2009/106623 | 9/2009 |
| WO | WO 2010/061882 | 6/2010 |
| WO | WO 2010/122431 | 10/2010 |
| WO | WO 2013/007729 | 1/2013 |

OTHER PUBLICATIONS

"Specification for Threading, Gauging and Thread Inspection of Casing, Tubing, and Line Pipe Threads," American Petroluem Institute, Specification 5B, Apr. 2008, 15$^{th}$ Edition. pp. 1-125.
Extrait du Catalogue N 940, 1994.
Opposition of EP 2325435, dated Mar. 13, 2014, 88 pages.
Fritz T et al, "Characterization of electroplated nickel", Microsystem Technologies, Dec. 31, 2002, vol. 9, No. 1-2, pp. 87-91, Berlin, DE.
Kazutoshi Ohashi et al, "Evaluation of r-value of steels using Vickers hardness test", Journal of Physics: Conference Series, Aug. 7, 2012, p. 12045, vol. 379, No. 1, Institute of Physics Publishing, Bristol, GB.
Craig, Bruce D., "Effect of Copper on the Protectiveness of Iron Sulfide Films", Corrosion, National Association of Corrosion Engineers, 1984, vol. 40, Issue 9, pp. 471-474.
Morice et al., "Möessbauer Studies of Iron Sulfides", J. Inorg. Nucl. Chem., 1969, vol. 31, pp. 3797-3802.
Hutchings et al., "Ratio of Specimen thickness to charging area for reliable hydrogen permeation measurement", British Corrosion. Journal, 1993, vol. 28, Issue 4, pp. 309-312.
Clark, A. Horrell, "Some Comments on the Composition and Stability Relations of Mackinawite", Neues Jahrbuch fur Mineralogie, 1966, vol. 5, pp. 300-304, London, England.
Bruzzoni et al., "Study of Hydrogen Permeation Through Passive Films on Iron Using Electrochemical Impedance Spectroscopy", PhD Thesis, 2003, Universidad Nacional del Comahue de Buenos Aires, Argentina.
"Seamless Steel Tubes for Pressure Purposes—Technical Delivery Conditions—Part 1: Non-alloy Steel Tubes with Specified Room Temperature Properties" British Standard BS EN 10216-1:2002 E:1-26, published May 2002.
"Seamless Steel Tubes for Pressure Purposes—Technical Delivery Conditions—Part 2: Non-alloy and Alloy Steel Tubes with Specified Elevated Temperature Properties" British Standard BS EN 10216-2:2002+A2:2007:E:1-45, published Aug. 2007.
"Seamless Steel Tubes for Pressure Purposes—Technical Delivery Conditions—Part 3: Alloy Fine Grain Steel Tubes" British Standard BS EN 10216-3:2002 +A1:2004 E:1-34, published Mar. 2004.

(56) References Cited

OTHER PUBLICATIONS

"Seamless Steel Tubes for Pressure Purposes—Technical Delivery Conditions—Part 4: Non-alloy and Alloy Steel Tubes with Specified Low Temperature Properties" British Standard BS EN 10216-4:2002 + A1:2004 E:1-30, published Mar. 2004.
Aggarwal, R. K., et al.: "Qualification of Solutions for Improving Fatigue Life at SCR Touch Down Zone", Deep Offshore Technology Conference, Nov. 8-10, 2005, Vitoria, Espirito Santo, Brazil, in 12 pages.
Anelli, E., D. Colleluori, M. Pontremoli, G. Cumino, A. Izquierdo, H. Quintanilla, "Metallurgical design of advanced heavy wall seamless pipes for deep-water applications", 4th International Conference on Pipeline Technology, May 9-13, 2004, Ostend, Belgium.
Asahi, et al., Development of Ultra-high-strength Linepipe, X120, Nippon Steel Technical Report, Jul. 2004, Issue 90, pp. 82-87.
ASM Handbook, Mechanical Tubing and Cold Finishing, Metals Handbook Desk Edition, (2000), 5 pages.
ASTM A 213/A 213M "Standard Specification for Seamless Ferritic and Austenitic Alloy-Steel Boiler, Superheater, and Heat-Exchanger Tubes".
ASTM A182/A182M "Standard Specification for Forged or Rolled Alloy and Stainless Steel Pipe Flanges, Forged Fittings, and Valves and Parts for High-Temperature Service".
ASTM A336/A336M "Standard Specification for Alloy Steel Forgings for Pressure and High-Temperature Parts".
ASTM A355 which is related to "Seamless Ferritic Alloy-Steel Pipe for High-Temperature Service".
Bai, M., D. Liu, Y. Lou, X. Mao, L. Li, X. Huo, "Effects of Ti addition on low carbon hot strips produced by CSP process", Journal of University of Science and Technology Beijing, 2006, vol. 13, N° 3, p. 230.
Beretta, Stefano et al., "Fatigue Assessment of Tubular Automotive Components in Presence of Inhomogeneities", Proceedings of IMECE2004, ASME International Mechanical Engineering Congress, Nov. 13-19, 2004, pp. 1-8.
Berner, Robert A., "Tetragonal Iron Sulfide", Science, Aug. 31, 1962, vol. 137, Issue 3531, pp. 669.
Berstein et al.,"The Role of Traps in the Microstructural Control of Hydrogen Embrittlement of Steels" Hydrogen Degradation of Ferrous Alloys, Ed. T. Oriani, J. Hirth, and M. Smialowski, Noyes Publications, 1988, pp. 641-685.
Boulegue, Jacques, "Equilibria in a sulfide rich water from Enghien-les-Bains, France", Geochimica et Cosmochimica Acta, Pergamon Press, 1977, vol. 41, pp. 1751-1758, Great Britain.
Cancio et al., "Characterization of microalloy precipitates in the austenitic range of high strength low alloy steels", Steel Research, 2002, vol. 73, pp. 340-346.
Carboni, A., A. Pigani, G. Megahed, S. Paul, "Casting and rolling of APIx70 grades for artic application in a thin slab rolling plant", Stahl u Eisen, 2008, N° 1, p. 131-134.
Chitwood, G. B., et al.: "High-Strength Coiled Tubing Expands Service Capabilities", as presented at the 24th Annual OTC in Houston, Texas, May 4-7, 1992, in 15 pages.
D.O.T. 178.68 Spec. 39, pp. 831-840, Non reusable (non refillable) cylinders, Oct. 1, 2002.
Davis, J.R., et al. "ASM—Speciality Handbook—Carbon and alloy steels" ASM Speciality Handbook, Carbon and Alloy Steels, 1996, pp. 12-27, XP002364757 US.
De Medicis, Rinaldo, "Cubic FeS, A Metastable Iron Sulfide", Science, American Association for the Advancement of Science, Steenbock Memorial Library, Dec. 11, 1970, vol. 170, Issue 3963, pp. 723-728.
Drill Rod Joint Depth Capacity Chart, downloaded Jan. 15, 2013; http://www.boartlongyear.com/drill-rod-joint-depth-capacity-chart.
Echaniz, "The effect of microstructure on the KISSC of low alloy carbon steels", NACE Corrosion '98, EE. UU., Mar. 1998, pp. 22-27, San Diego.
Echaniz, G., Morales, C., Perez, T., "Advances in Corrosion Control and Materials in Oil and Gas Production" Papers from Eurocorr 97 and Eurocorr 98, 13, P. S. Jackman and L.M. Smith, Published for the European Federation of Corrosion, No. 26, European Federation of Corrosion Publications, 1999.
Fang, Hong-Sheng, et al.: "The Developing Prospect of Air-cooled Bainitic Steels", International Journal of Issi, vol. 2, No. 2, Feb. 1, 2005, pp. 9-18.
Fratini et al.: "Improving friction stir welding of blanks of different thicknesses," Materials Science and Engineering A 459 (2007).
Gojic, Mirko and Kosec, Ladislav, , "The Susceptibility to the Hydrogen Embrittlement of Low Alloy Cr and CrMo Steels", ISIJ International, 1997, vol. 37, Issue 4, pp. 412-418.
Gomez, G., et al.: "Air cooled bainitic steels for strong, seamless pipes—Part 1—allowy design, kinetics and microstructure", Materials Science and Technology, vol. 25, No. 12, Dec. 1, 2009. (XP002611498).
Heckmann, et al., Development of low carbon Nb—Ti—B microalloyed steels for high strength large diameter linepipe, Ironmaking and Steelmaking, 2005, vol. 32, Issue 4, pp. 337-341.
Hollomon, J.H., et al., Time-tempered Relations in Tempering Steel. New York Meeting, pp. 223-249, 1945.
Howells, et al.: "Challenges for Ultra-Deep Water Riser Systems", IIR, London, Apr. 1997, 11 pages.
Iino et al., "Aciers pour pipe-lines resistant au cloquage et au criquage dus a l'hydrogene", Revue de Metallurgie, 1979, vol. 76, Issue 8-9, pp. 591-609.
Ikeda et al., "Influence of Environmental Conditions and Metallurgical Factors on Hydrogen Induced Cracking of Line Pipe Steel", Corrosion/80, National Association of Corrosion Engineers, 1980, vol. 8, pp. 8/1-8/18, Houston, Texas.
ISO. Petroleum and natural gas industries—Materials for use in H2Scontaining environments in oil and gas production. ANSI/NACE ISO, 145 pages, 2009.
Izquierdo, et al.: "Qualification of Weldable X65 Grade Riser Sections with Upset Ends to Improve Fatigue Performance of Deepwater Steel Catenary Risers", Proceedings of the Eighteenth International Offshore and Polar Engineering Conference, Vancouver, BC, Canada, Jul. 6-11, 2008, p. 71.
Johnston, P. W., G.Brooks, "Effect of Al2O3 and TiO2 Additions on the Lubrication Characteristics of Mould Fluxes", Molten Slags, Fluxes and Salts '97 Conference, 1997 pp. 845-850.
Keizer, Joel, "Statistical Thermodynamics of Nonequilibrium Processes", Springer-Verlag, 1987.
Kishi, T., H.Takeucgi, M.Yamamiya, H.Tsuboi, T.Nakano, T.Ando, "Mold Powder Technology for Continuous Casting of Ti-Stabilized Stainless Steels", Nippon Steel Technical Report, No. 34, Jul. 1987, pp. 11-19.
Korolev, D. F., "The Role of Iron Sulfides in the Accumulation of Molybdenum in Sedimentary Rocks of the Reduced Zone", Geochemistry, 1958, vol. 4, pp. 452-463.
Lee, Sung Man and Lee, Jai Young, "The Effect of the Interface Character of TiC Particles on Hydrogen Trapping in Steel", Acta Metall., 1987, vol. 35, Issue 11, pp. 2695-2700.
Mehling, Wilfred L.: "Hot Upset Forging," ASM Handbook vol. 14, 1998, pp. 84-95.
Mishael, et al., "Practical Applications of Hydrogen Permeation Monitoring," Corrosion, Mar. 28-Apr. 1, 2004, Corrosion 2004, Nacional Association of Corrosion Engineers, vol. Reprint No. 04476.
Mukongo, T., P.C.Pistorius, and A.M.Garbers-Craig, "Viscosity Effect of Titanium Pickup by Mould Fluxes for Stainless Steel", Ironmaking and Steelmaking, 2004, vol. 31, No. 2, pp. 135-143.
Mullet et al., "Surface Chemistry and Structural Properties of Mackinawite Prepared by Reaction of Sulfide Ions with Metallic Iron", Geochimica et Cosmochimica Acta, 2002, vol. 66, Issue 5, pp. 829-836.
Murcowchick, James B. and Barnes, H.L., "Formation of a cubic FeS", American Mineralogist, 1986, vol. 71, pp. 1243-1246.
NACE MR0175/ISO 15156-1 Petroleum and natural gas industries—Materials for use in H2S-containing Environments in oil and gas production—Part 1: General principles for selection of cracking-resistant materials, Jun. 28, 2007.

(56) References Cited

OTHER PUBLICATIONS

Nagata, M., J. Speer, D. Matlock, "Titanium nitride precipitation behavior in thin slab cast high strength low alloyed steels", Metallurgical and Materials Transactions A, 2002 ,vol. 33A, p. 3099-3110.

Nakai et al., "Development of Steels Resistant to Hydrogen Induced Cracking in Wet Hydrogen Sulfide Environment", Transactions of the ISIJ, 1979, vol. 19, pp. 401-410.

Nandan et al.: "Recent advances in friction-stir welding—Process, weldment structure and properties," Progress in Materials Science 53 (2008) 980-1023.

Pollack, Herman, W., Materials Science and Metallurgy, Fourth Edition, pp. 96 and 97, 1988.

Pressure Equipment Directive 97/23/EC, May 29, 1997, downloaded from website:http://ec.europa.eu/enterprise/pressure_equipment/ped/index_en.html on Aug. 4, 2010.

Prevéy, Paul, et al., "Introduction of Residual Stresses to Enhance Fatigue Performance in the Initial Design", Proceedings of Turbo Expo 2004, Jun. 14-17, 2004, pp. 1-9.

Rickard, D.T., "The Chemistry of Iron Sulphide Formation at Low Temperatures", Stockholm Contrib. Geol., 1969, vol. 26, pp. 67-95.

Savatori et al.: European Commssion Report, EUR 2006, EUR2207, 3 pp. STN_ABSTRACT.

Shanabarger, M.R. and Moorhead, R. Dale, "H2O Adsorption onto clean oxygen covered iron films", Surface Science, 1996, vol. 365, pp. 614-624.

Shoesmith, et al., "Formation of Ferrous Monosulfide Polymorphs During Corrosion of Iron by Aqueous Hydrogen Sulfide at 21 degrees C", Journal of the Electrochemical Society, 1980, vol. 127, Issue 5, pp. 1007-1015.

Skoczylas, G., A.Dasgupta, R.Bommaraju, "Characterization of the chemical interactions during casting of High-titanium low carbon enameling steels", 1991 Steelmaking Conference Proceeding, pp. 707-717.

Smyth, D., et al.: Steel Tubular Products, Properties and Selection: Irons, Steels, and High-Performance Alloys, vol. 1, ASM Handbook, ASM International, 1990, p. 327-336.

Spry, Alan, "Metamorphic Textures", Perganon Press, 1969, New York.

Taira et al., "HIC and SSC Resistance of Line Pipes for Sour Gas Service", Nippon Kokan Technical Report, 1981, vol. 31, Issue 1-13.

Taira et al., "Study on the Evaluation of Environmental Condition of Wet Sour Gas", Corrosion 83 (Reprint. No. 156, National Association of Corrosion Engineers), 1983, pp. 156/2-156/13, Houston, Texas.

Takeno et al., "Metastable Cubic Iron Sulfide—With Special Reference to Mackinawite", American Mineralogist, 1970, vol. 55, pp. 1639-1649.

Tenaris brochure. Coiled Tubes HS80CRA, 2 pages, 2008.

Tenaris brochure. Coiled Tubes Suggested Field Welding Procedure (GTAW) for Coiled Tubing Grads HS70, HS80, HS90, HS11 0, 3 pages, 2007.

Tenaris brochure. Coiled Tubing for Downhole Applications, 10 pages, 2007.

Tenaris Newsletter for Pipeline Services, Apr. 2005, p. 1-8.

Tenaris Newsletter for Pipeline Services, May 2003, p. 1-8.

Thethi, et al.: "Alternative Construction for High Pressure High Temperature Steel Catenary Risers", OPT USA, Sep. 2003, p. 1-13.

Thewlis, G., Weldability of X100 linepipe, Science and Technology of Welding and Joining, 2000, vol. 5, Issue 6, pp. 365-377.

Tivelli, M., G. Cumino, A. Izquierdo, E. Anelli, A. Di Schino, "Metallurgical Aspects of Heavy Wall—High Strength Seamless Pipes for Deep Water Applications", RioPipeline 2005, Oct. 17-19, 2005, Rio (Brasil), Paper n° IBP 1008_05.

Todoroki, T. Ishii, K. Mizuno, A. Hongo, "Effect of crystallization behavior of mold flux on slab surface quality of a Ti-bearing Fe—Cr—Ni super alloy cast by means of continuous casting process", Materials Science and Engineering A, 2005, vol. 413-414, p. 121-128.

Turconi, G. L.: "Improvement of resistance to SSC initiation and propagation of high strength OCTG through microstructure and precipitation control"; "Paper 01077", NACE International, Houston, TX, Mar. 16, 2001. (XP009141583).

Vaughan, D. J. and Ridout, M.S., "Moessbauer Studies of Some Sulphide Minerals", J. Inorg Nucl. Chem., 1971, vol. 33, pp. 741-746.

Yu, et al.: "New steels and alloys in mechanical engineering / ed.," M: Mechanical Engineering, 1976, p. 19.

\* cited by examiner

THREADED JOINT SEALED TO INTERNAL AND EXTERNAL PRESSURES

CROSS-REFERENCE TO RELATED APPLICATIONS

This application claims the benefit of priority of European Patent Application Number 09176859.8, filed on Nov. 24, 2009 and entitled THREADED JOINT SEALED TO [UL-TRA HIGH] INTERNAL AND EXTERNAL PRESSURES, the entirety of which is incorporated herein by reference and should be considered a part of this specification

BACKGROUND

Field

Embodiments of the present disclosure relate to threaded joints for joining tubes, particularly threaded joints for tubes employed in environments under high pressure and high temperature and in ultra deep wells such as pipes in gas or oil production and/or drilling well casings.

Description of the Related Art

Pipes employed in ultra-deep oil exploration wells, high-pressure-high temperature wells, and salt domes often experience demanding conditions. For example, pipes employed in these applications may experience extremely high pressures (approximately 20,000 psi) and temperatures combined with high compression-tension-torque forces that act upon the pipe body and joints that connect the pipes To withstand these pressures, temperatures, and other forces, pipes with an above-standard wall thickness (e.g., thicker than about 0.5 inch have been employed. It is desirable that the joints of the pipes be capable of offering similar or equal performance to pipe body resistance when both pipe and joint are subjected to compression and/or tension under internal and/or external pressures.

Presently employed joints are capable of performing comparably to standard pipe (e.g., pipes having standard wall thickness). However, a need exists for joints capable of matching the performance of the body of thick wall pipes (e.g., pipes having a wall thickness greater than about 0.5 inches).

The industry has recently become able to produce thicker pipes by improving the chemical composition and heat treatment processes employed to form the pipes, there is a shortcoming regarding joints capable of equaling the performance of the newly developed thick wall pipes.

Solutions have been developed for joints offering improved running performance and structural capacity. There have also been attempts to improve threaded joints for use on pipes with thick walls, (e.g. for casing sizes with enhanced resistance to very high external pressure).

Most of the prior art joints considered above are not capable of meeting the requirements set for the aforementioned adverse environmental conditions. For example, these solutions are mainly applicable to pipes with standard wall thickness and are not suitable for use in extremely adverse conditions such as those imposed by ultra high internal and external pressures. One common reason is that sealability at ultra high pressures requires high interferences and torque values, and therefore solutions designed for pipes having standard wall thicknesses experience critical plastic deformations and galling during make-up operations.

Furthermore, in designing threaded joints in this technological field, every slight change in design of one feature forming the joint may have unforeseen effects in the overall performance, and needs to be carefully evaluated. Solutions that are appropriate for pipes of standard state of the art wall thickness ranges do not give the same performances on pipes with thicker walls, and the consequences of introducing even small configuration changes may yield unforeseen and non-obvious results which must be thoroughly tested before they can be accepted. Thus, pipe bodies having wall thicknesses above-standard wall ranges, would make unpredictable the performance of a joint originally designed for standard thickness pipes.

Therefore, despite previous and ongoing efforts, there is still a need for a top performing joint for use in the oil and gas exploration industry that exhibits running performance and structural capacity capable of facing the most demanding service conditions (e.g., extremely high pressures and temperatures, combined with compression-tension-torque forces acting on the joint). Additionally, such joints are required to meet the highly demanding requirements set by standards that apply to the industry, such as. ISO 13679 CAL IV.

SUMMARY

In an embodiment, a threaded joint for pipes is provided. The threaded joint comprises a pin and a box in the form of a coupling. The pin comprises at least one first end portion that includes a first end surface and a male threaded portion proximate the at least one first end portion. the box comprises at least one second end portion including a second end surface that does not substantially face against any surface of the pin and a female threaded portion proximate the at least one second end portion. The male and female threaded portions are further configured to mate. The pin comprises a first pin sealing surface on the first end portion in the vicinity of the first end surface on a first side of the male threaded portion and a second pin sealing surface proximate to a second side of the male threaded portion opposite to the first side of the male threaded portion. The box, on a first side of the female threaded portion, comprises a first box sealing surface and an abutment shoulder, configured to mate with the first pin end surface and having a second box sealing surface close to a second side of the female threaded portion opposite to the first side. The first pin sealing surface is configured to mate with the first box sealing surface to form an internal metal-to-metal seal and the second pin sealing surface is configured to mate with the second box sealing surface to form an external metal-to-metal seal, wherein the internal and external seals comprise the contact of one toroidal sealing surface with one frusto-conical sealing surface.

In another embodiment, a threaded joint for pipes is provided. The threaded joint provided comprises a pin having a pin distal end with an end surface and a male threaded portion on an outer radial surface of the pin proximate the distal end, a first pin sealing surface distal of the male threaded portion and a second pin sealing surface proximal of the male threaded surface. The threaded joint further comprises a box configured to mate with the pin, the box having a box distal end and a female threaded portion on an inner radial surface of the box proximate the box distal end, a first box sealing surface located proximal of the female threaded portion and a second box sealing surface located distal of the female threaded surface. The first pin sealing surface is configured to mate with the first box sealing surface to form an internal metal-to-metal seal and the second pin sealing surface is configured to mate with the second box sealing surface to form an external metal-tometal seal, each of the internal and external seals comprising the contact of one toroidal surface with one frusto-conical surface.

BRIEF DESCRIPTION OF THE DRAWINGS

Further characteristics and advantages of the embodiments disclosed herein will become more apparent in the light of the detailed description of a preferred but not exclusive embodiment of a threaded joint for pipes described by way of a non-limiting example, with the aid of accompanying drawings in which.

DETAILED DESCRIPTION

Conventional seals formed by threaded joints are not designed to withstand extreme pressures arriving from the threaded portion. Thus, they may be overcome (i.e., lose tightness) by extremely high pressures if external pressure reaches the internal seal and/or internal pressure reaches the external seal, as such in the sense that contact pressure may be overcome by fluid pressure, and/or a plastic deformation may take place, thus leading to failure of the sealing function of the joint.

Finite element analysis (FEA) tests of prior art joints with only one internal metal-to-metal seal illustrate that such joints are not capable of providing performance similar or equal to pipe body resistance, when both pipe and joint are submitted to compression and/or tension under internal and/or external pressures. When extremely high external pressure is applied, the internal seal of a prior art joint is overcome by the pressure and opens. Such failure is due to external pressure acting against the internal metal-to-metal seal, which deforms and opens the pin nose and the metal-to-metal seal.

Embodiments of the present disclosure are directed to threaded joints for thick wall pipes which meet operative requirements set for use in very adverse environmental conditions. In other embodiments, the disclosed threaded connections form joints having a reliable and stable high pressure sealability against both internal and external pressures. In certain embodiments, the threaded joints are suitable for pipes having wall thicknesses in excess of about 0.5 inches.

In one embodiment, a threaded joint for a pipe can include a pin and a box in the form of a coupling. In an embodiment, the pin comprises at least one pin end portion that includes a pin end surface a male threaded portion positioned proximate the at least one pin end portion. In further embodiments, the box comprises a box end portion, including a box end surface not facing against any surface of the pin when the joint is made-up, a female threaded portion positioned near the at least one box end portion, the male and female threaded portions mating with each other during a make-up operation. The pin further comprises a first pin sealing surface positioned on the pin end portion proximate the pin end surface on a first side of the male threaded portion and a second pin sealing surface close to a second side of the male threaded portion opposite to the first side, wherein the box, on a first side of the female threaded portion, has a first box sealing surface and an abutment shoulder, abutting against the first pin end surface after joint make-up, and having a second box sealing surface close to a second side of the female threaded portion opposite to the first side, the first pin sealing surface mating with the first box sealing surface and the second pin sealing surface mating with the second box sealing surface after make-up whereby an internal and an external metal-to-metal seal are produced, which are each constituted by the contact of one toroidal sealing surface with one frusto-conical sealing surface.

Beneficially, embodiments of the disclosed joints are capable of dealing with high stresses while remaining within the elastic field and still avoiding galling. For example, embodiments disclosed herein provide a joint having a combined sealing action of internal and external seals, with reliable sealing efficiency during operation, which prevents occurrence of galling in the metal-to-metal seals during make-up.

Furthermore, by means of an optimization and a synergy of the geometric variables, the joint disclosed in the embodiments described herein achieves an external metal-to-metal seal which protects the whole threaded portion while still ensuring structural stability of the seal and the desired contact pressures between sealing surfaces. Similarly, an internal metal-to-metal seal protects the threaded portion from the internal fluids entering between the threads.

By including a dual metal-to-metal seal, one of which is internal and the other external with respect to the thread, the joint is advantageously capable of providing reliable sealability due to very stiff, rigid, stable contact pressure by virtue of pin and box design optimized for thick wall pipes. This reliable sealability overcomes a common problem in such cases, such as galling due to high contact pressures in the metal-to-metal seals, by reducing contact pressure through a controlled interference during make-up.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

Figure 1:
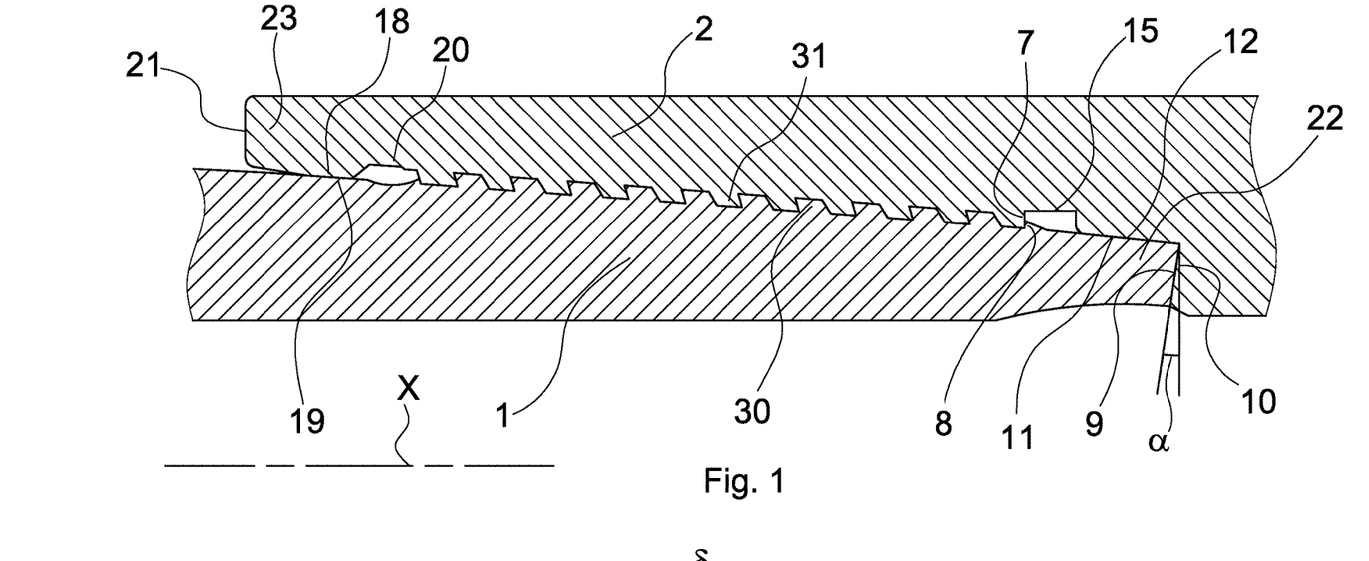
FIG. 1 is a schematic cross-sectional diagram illustrating an axial section of a detail of an embodiment of a joint of the present disclosure.
Figure 2:
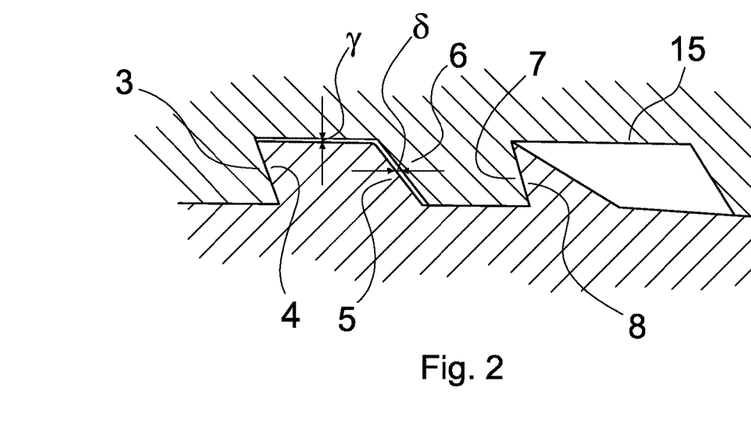
FIG. 2 is an enlargement of a detail of FIG. 1.

With particular reference to FIGS. 1 and 2, there is shown an embodiment of a threaded joint or connection for joining pipe segments. In certain embodiments, the threaded joints or connections may be employed for thick walled pipes. In the context of this description, the term "thick wall" may include, but is not limited to, pipes having a thickness greater than or equal to about 0.5 inches. In further embodiments, the joints described herein are particularly advantageous for use on pipes having a nominal wall thickness greater than or equal to about 0.7 inch.

An embodiment of a joint of the present disclosure comprises a male member, referred as pin 1 with external male threaded portion 30. The joint further comprises a female member referred to as a box 2 comprising internal female threaded portion 31 proximate (e.g., adjacent) a free end. The external male threaded portion 30 and the internal female threaded portion 31 can abut one another at respective surfaces 7 and 8. The pin 1 has a first male sealing surface 11 before the beginning of (e.g., distally of) the male threaded portion 30 and a second male sealing surface 19 beyond (e.g., proximally of) the end of the threaded area on an opposite side of the male threaded portion 30. Similarly, the box 2 has a first female sealing surface 12 on the inner side (e.g. proximally) with respect to the female threaded portion 31 and a second female sealing surface 18 on the opposite side of (e.g., distally of) the female threaded portion 31.

The sealing surfaces 11, 12, 18, 19 of both pin 1 and box 2 mate after make-up to respectively form an internal and an external metal-to-metal seal. The internal seal is produced by the reciprocal contact of the surfaces 11 and 12 and the external seal is produced by the reciprocal contact of the surfaces 18 and 19. Advantageously, the metal-to-metal seals are both made by a contact between toroidal to frusto-conical surfaces.

In one embodiment, the internal seal is made by a pin toroidal surface 11 and a box frusto-conical surface 12. In another embodiment, the external seal is made by a pin frusto-conical surface 19 and a box toroidal surface 18. The toroidal surface 11 may be provided on the pin 1 near the pin nose and the frusto-conical surface 12 may be provided on that portion of the internal surface of the box 2 proximate (e.g., adjacent) the abutment shoulder 10. In the case of the external seal, the toroidal surface 18 may be on the box 2 near the box nose 23 and the frusto-conical surface 19 may be on the external surface of the pin 1 proximate (e.g., adjacent) to the area where the cylindrical external surface of the pipe begins. Such a configuration positions the circular surface (so defined when considered on a plane section) or toroidal surface (so defined when considered tri-dimensionally) on the less rigid parts, such as the pin free end and box free end. Similarly, this configuration positions the tapered frusto-conical surfaces on the stiffer parts, such as ends of the threaded portion of pin and box that are closer to the pipe body.

While too small a radius of toroidal sealing surfaces 11 and 18 of pin 1 and box 2 may produce detrimental stress concentrations due to very high contact pressure, too large a radius may, in contrast, tend to behave as a tapered surface. In an embodiment, the radius of toroidal sealing surfaces 11 and 18 of pin 1 and box 2 may vary within the range between about 30 mm and about 100 mm. In further embodiments, the radius of toroidal sealing surfaces 11 and 18 preferably has a value of about 80 mm. This radius magnitude range has been found to provide improved seal performance by finite element analysis (FEA) tests which confirm that a radius in a range between about 30 mm and about 100 mm gives the joint a sealability that meets the pipe body performance.

The box may further comprise a box nose 23. Box nose 23 at made-up of the joint provides a substantially non-abutting end 21. That is to say, when the joint is assembled, no surface transversal to the joint axis X is positioned in front of the end surface 21, neither close thereto nor distant therefrom. In an embodiment, box 2 may be a coupling or sleeve and not the extremity of a pipe of commercial length. For example, the box may be a short coupling or sleeve used to join two segments of pipe. In this case, this type of joint is referred to as T&C (threaded and coupled).

The pin may further comprise a pin nose 22. Pin nose 22 may include an end surface or abutting shoulder 9 that abuts against a mating box shoulder 10 after make-up is completed. In an embodiment, the abutting shoulder 10 and pin end surface 9 may exhibit a negative angle α respect to a plane perpendicular to the joint axis X (e.g., an angle extending towards the pin 1). In other embodiments, the angle α may be approximately zero with respect to the plane perpendicular to the joint axis X (e.g., the abutting shoulder 10 and pin end surface 9 are approximately horizontal).

In further embodiments, the threaded portions 30 and 31 can be made with various profiles, however improved performance may be achieved when the threaded portions are chosen with a hooked thread. The hooked thread may be provided with an angle of the load flanks 3 and 4 within the range between about −10° and about 0°, as illustrated in FIG. 2. In further embodiments, load flank angles of the thread may be within the range between about −7 and about −2.5°. Beneficially, this thread shape improves the joint overall sealing performance, as confirmed by tests using FEA models. In fact, by FEA analysis, the indicator "sealing performance" shows an improvement when using negative load flank angles in the threads.

In order to reduce sliding distance and to provide an easier stabbing and faster make-up of the joint, a preferred type of thread to be used on the joint is a hooked thread with less than about 5 threads per inch (TPI). In further embodiments, a 3 TPI thread with crest to root contact may be employed. In alternative embodiments, a 4 TPI thread can also be advantageously used. The large pitch of the thread, 3 TPI, or 4 TPI in an alternative embodiment, reduces the likelihood of cross threaded portions, as well as the number of turns up to the power tight position and further contributes to an easy and safe make-up.

In additional embodiments, a thread design is chosen such that root to crest contact between box thread crest and pin thread root and diametrical clearance between box thread roots and pin thread crests is provided.

The thread may also be tapered in the axial direction. For example, in certain embodiments, the taper angle may have a slope that is within the range of about 7% to about 15% with respect to the joint axis X. In other embodiments, the taper angle may be about 11%, where n % means here the angle between the thread line and the axis X, having the value arctg(n/100). Advantageously, a thread slope of such magnitude allows easy and safe make-up operation. The high slope chosen for the thread taper ensures fast make-up and determines a deep stabbing that contributes to the alignment of the pipe with the coupling, or box, during the assembling of the pipe string.

In one embodiment, the diametrical taper of the pin and the box frusto-conical sealing surfaces 12 and 19 may be set at a value approximately greater than the thread taper. For example, the diametrical taper of the frusto-conical sealing surfaces 12 and 19 may possess a slope that varies within the range between about 20% and about 30%. In further embodiments, the diametrical taper of the frusto-conical sealing surfaces 12 and 19 is selected to be about 25%.

In additional embodiments, the relative tapers of the frusto-conical sealing surface 12 on the pin 1 and box 2 may be different. In an embodiment of the joint, the taper of the frusto-conical sealing surface 12 on the box 2 may be smaller than the taper of frusto-conical sealing surface 19 of the pin 1. This feature enables a make-up sequence to be achieved whereby threaded portions 30, 31 close firstly, internal seal 11, 12 closes secondly, and external seal 18, 19 closes lastly. The distribution of dope on the threaded portions is improved in this manner, inhibiting the development of undesirable pressure peaks caused by dope entrapment in the thread interstices.

The joint further provides for regions whereby dope may expand. For example, the joint comprises a first dope expansion annular groove 15 positioned on an internal surface of the box 2, proximate the abutment surface 10 The joint further comprises a second dope expansion annular groove 20 at the second end of the threaded portions 31 before the external seal 18, 19 on the internal surface of the box 2. The volume of each dope expansion annular groove, measured in mm³, may vary within the range between about 10% and about 50% of the square of the nominal external diameter (OD) of the pipe, where their volume is determined by the following empirical formula:

$$0.1*(OD)^2 < VOLUME < 0.5*(OD)^2$$

where OD is given in mm and VOLUME is given in mm³.

The male and female threads are designed with dimensions such that, after make-up of the joint is substantially complete, there remain gaps between stabbing flanks 5, 6 of pin 1 and box 2 threads. The distance between the stabbing flanks of threads has a magnitude comprised in the range between about 0.01 mm and about 0.12 mm when measured on a projection parallel to the joint axis X. The stabbing flank angle is defined in the range between about 20° and about 30°.

In addition to the advantages already mentioned above, the joint disclosed in the embodiments described herein provides various other advantages, of which a non exhaustive list is given hereafter. The provision of dual metal-to-metal seals (internal and external to threaded portions) gives an improved performance, because external fluid pressure is prevented by the external seal from penetrating interstices between the threads and from reaching the internal metal-to-metal seal. On the opposite side, internal fluid pressure is prevented from penetrating between the threads and from reaching the external seal.

Additionally, both internal and external metal-to-metal seals may also be pressure energized during operation, namely, external fluid pressure energizes the external seal, and internal fluid pressure energizes the internal seal.

In further embodiments, the joint described herein can be used in several types of joints, namely, threaded and coupled, integral, flush or semi-flush. For certain applications, integral and flush joints require particular hot or cold deformations, e.g. so-called swaging or expansion, in proximity to the pipe ends prior to thread machining, and they may be detrimental for the properties of the steel of which the pipes and joint are made. Therefore, for uses in extremely high loading conditions, undeformed pin and box are preferred. Hence, even though embodiments of the disclosed couplings may be used in any kind of joint, a particularly advantageous performance is achieved in a threaded and coupled (T&C) joint. On the other hand, the higher cost of using the joint disclosed in embodiments herein in integral joints may be justified when there is the need to make a flush or semi-flush joint, which may have a reduced tension efficiency, since the pin member needs to accommodate, within its wall thickness, both the threaded portion and all or part of the box nose.

The tests made on embodiments of the disclosed joints have shown that both internal and external seals 11, 12, 18, 19 remain closed all along the whole von Mises envelope, even in the absence of internal or external pressure that contributes to energizing the seals when the joint is under real operative conditions.

In further embodiments, the joint is particularly suited for supporting high axial compression forces on the pipe, forces that bring the lead-in flanks into reciprocal contact, and thus begin to bear the compression load parallel to the shouldering surfaces, while the area proximate (e.g., adjacent) to said surfaces is still in the elastic deformation state.

As already mentioned above, the features of the disclosed embodiments result in a convenient make-up sequence that enables dope evacuation and reduces galling, because the threaded portion is the first to be closed (i.e. "reaches the final position"), and only after the excess dope is squeezed from the threaded portion are the metal-to-metal seals closed. Such sequence ensures that no dope is entrapped at high pressures in the cavity defined between metal-to-metal seals after make-up, wherein the dope pockets 15, 20 act as additional "lungs" for the dope squeezed by the threads.

In further embodiments, the joint described herein can also be advantageously used in association with dope-free surface treatments of the joint. With particular reference to the embodiment of FIGS. 3A and 3B, where corresponding elements of the joint are indicated with the same numerals of the above described embodiments, a surface treatment can be carried out to improve the quality of the joint. In an embodiment, the surface treatment comprises coating the box surface with Mn phosphate and leaving a bare pin surface. Such treatment further improves galling resistance. Another improvement of the surface treatment is achieved by using API modified thread compound and the ecological thread compound together with Mn phosphate applied on a sand blasted surface.

In a first embodiment of a dope-free surface treatment, at least the surface of the threaded portion has a surface roughness Ra that varies within the range between about 2.0 μm and about 6.0 μm, the thread surface being covered by a first uniform layer of a dry corrosion inhibiting coating and the first layer being covered by a second uniform layer of dry lubricant coating.

The threaded portion 30 of the pin 1 may be provided with a protective layer on the surface of the thread. The threaded portion of the box 2 can have a perfectly similar shape or it can be made without the protective layer and be connected to the pin 1 provided with the protective layer. The protective layer, in this first embodiment, comprises:

a first layer of dry corrosion inhibiting coating comprising an epoxy resin containing particles of Zn, deposited on the thread metal surface. Advantageously these particles are made of 99% pure Zn and the thickness of the first layer may have a value that varies within the range between about 10 μm and about 20 μm, preferably between about 10 μm and about 15 μm.

a second layer of dry lubricant coating comprising a mixture of $MoS_2$ and other solid lubricants in an inorganic binder.

The second layer of dry lubricant coating may have a thickness that varies in the range between about 10 μm and about 20 μm, deposited over the surface of the dry corrosion inhibiting coating.

In a second embodiment of a dope-free surface treatment, at least the surface of the thread has a surface roughness Ra that varies in the range between about 2.0 μm and about 6.0 μm, the thread surface being covered by a single uniform layer of a dry corrosion inhibiting coating containing a dispersion of particles of solid lubricant. The thickness of this single layer value varies in the range between about 10 μm and about 20 μm.

The threaded portion 30 of the pin 1 may be provided with said single uniform protective layer on the surface of the thread. The threaded portion of the box 2 can have a perfectly similar shape or it can be made without the single uniform protective layer and be connected to the pin 1 provided with said single protective layer.

In both cases, the layer of dry corrosion inhibiting coating containing the dispersion of particles of solid lubricant can be applied by spraying, brushing, dipping or any other method in which the coating thickness can be controlled.

Regarding said first and second preferred embodiments of dope-free surface treatments, advantageously, the pipe segments can be assembled without further surface preparation prior to running in the field site or the addition of oil or grease. Thus, it is possible to transport and store the pipes in the oilfield without risking that the pipes lose their integrity because of corrosion on the threaded portions forming the connections; the connections can be assembled in the oilfield without removing the corrosion protection layer. Tests have given as result that there is substantially no galling on the seal or on thread and the connection had a very stable make up behaviour.

In a third embodiment of dope-free surface treatment, the surface of the thread may be provided with a coating comprising, in a first variant, a first layer with high friction and anti-seize properties laid on the overall surface of the pin 1 and a second layer with low friction properties laid on specific parts of the overall surfaces of either one of pin 1 or box 2. In a second variant, the third dope free surface treatment may comprise a first layer laid on the overall surface of the box 2 and a second layer laid on specific parts of the overall surfaces of either one of pin 1 or box 2. The specific parts are those adapted to produce reciprocal radial contact, or at least partially radial, (for example, crests in the box 2, roots in the pin 1 and metal-to-metal seals).

Figure 3A:
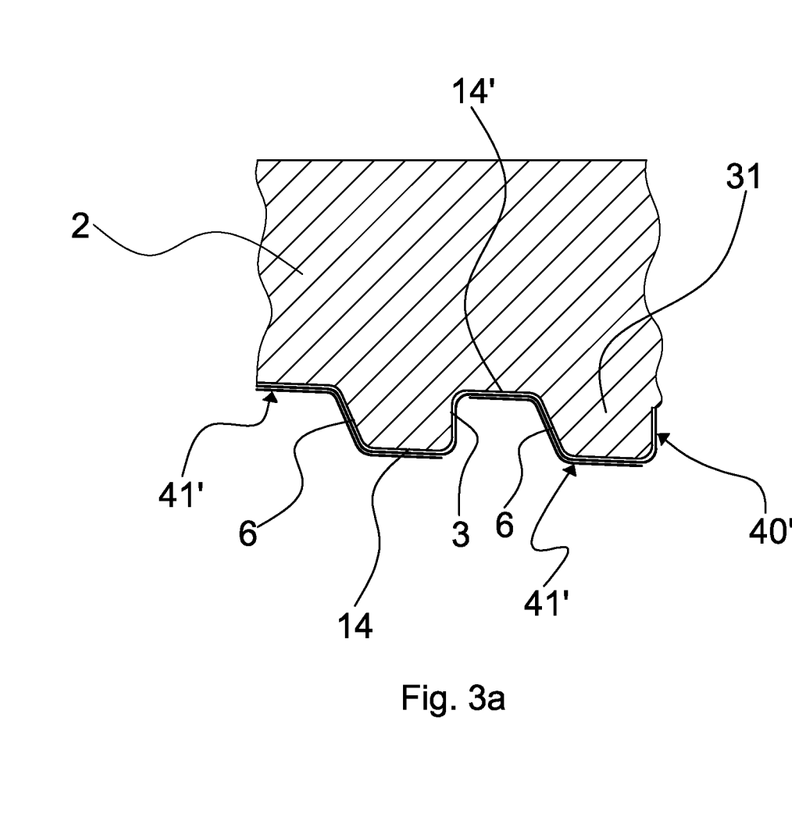
FIG. 3A is a schematic diagram illustrating an enlarged sectional detail of the thread of a box in accordance with another embodiment of a joint.
Figure 3B:
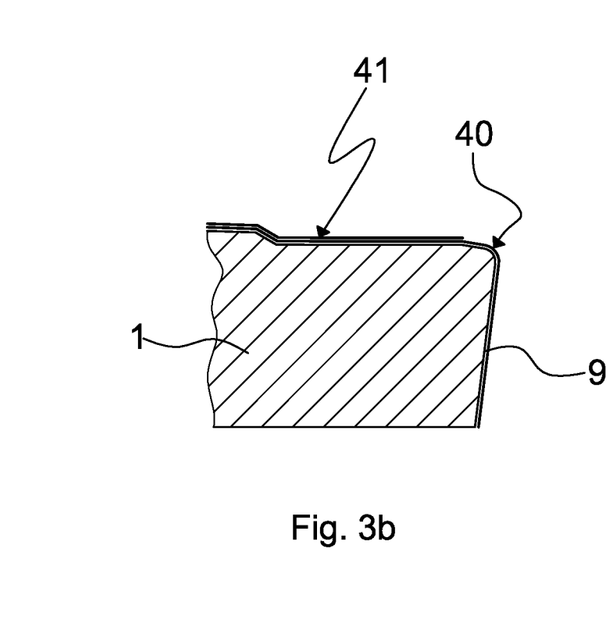
FIG. 3B is a schematic diagram illustrating an enlarged sectional detail of a pin in accordance with another embodiment of a joint.

With reference to said third preferred dope-free surface treatment, an enlargement of a thread of the box 2 is shown in FIG. 3A, and an enlargement of an abutment or nose region of the pin 1 is shown in FIG. 3B.

A first coating layer 40 laid on the overall surface of the pin 1 and a second coating layer 41 laid on a specific part of the overall surface of pin 1 are shown schematically in FIG. 3B, e.g. in this case on the external surface of the pin 1.

As shown in FIG. 3A the threaded portion 31 of the box 2 matching the pin 1 can have a perfectly similar first layer 40' and second layer 41' on the surface or it can be made without the protective layers or still alternatively the layer can be made with a different structure or materials. It is also possible to have a coating only on the surface of the pin 1 and no coating on the surface of the box 2.

The joint has, therefore, a low friction factor in the radial contact surfaces that provides adequate friction values to assure the make up of the joint at reasonable torque values comparable to those present when using dope; and a high friction factor on axial contact surfaces that provides a localised area with high friction capable of delivering high torsional strength to the joint once the shoulder gets in contact.

As one of ordinary skill in the art would understand, other coatings may be applied either below or above a polymeric coating. For example, a corrosion resistant layer can be applied over the polymeric coating, provided that the corrosion resistant layer does not affect the friction properties of the entire system. Additionally, the various coatings described herein may be applied to the overall surface of the pin member or box member, or only to selected areas. For example, in other embodiments, the coatings may be applied to the threaded portions of the pin member and the box member, to the metal-to-metal seal portions of the pin member and the box member, or to the shoulder portion of the pin member and the box member.

In the embodiments of the joint having dope-free coating, the male and female threads may be designed with such dimensions that, after make-up of the joint is completely performed, there remain preferably no gaps between stabbing flanks 5, 6 of pin 1 and box 2 threads.

Alternatively, all the above mentioned preferred embodiments of dope-free surface treatments can be provided in combination with a very small amount of dope, in particular uses. In such embodiments, the dope expansion can be accounted for either by gaps of appropriate dimension between thread flanks or by providing grooves of appropriate volume at one or at both ends of the threaded portion of the box.

The innovative design of embodiments of the disclosed joints was validated by FEA numerical modeling. The numerical simulations of the joints of the disclosed embodiments simulated those sequences of load conditions (various combinations of tension, compression, internal pressure, external pressure) defined by ISO 13679 standard. Such testing sequence was applied to various representative configurations, which are determined by combinations of several geometrical conditions (for example taper, interference, diameter, thickness) and steel grades. In regard to the sealability of the joint, the gas tightness of the metal-to-metal seals was verified for each load condition.

As a result, the joint described herein, according to the FEA analysis carried out, has proved that sealability against internal and/or external pressure is maintained under all the loading conditions tested.

Additionally, the design of the joint was verified by means of a full scale testing program particularly developed to assess its performance. Based on the requirements of the ISO 13679 CAL IV, this testing program evaluates all the aspects related to the use of the joint, such as ease and safety of stabbing, minimum dope required and over-doping capacity, make-up and break-out characterization, galling resistance, over-torque capacity, and sealability under repeated loading and thermal cycling. The joint design successfully passed all stages of the testing program.

As a matter of example, Tables 1 and 2 show results of the sealability tests (gas tightness) performed on 10¾ OD and 11¾ OD pipes.

TABLE 1

| Pipe: 10¾" 99.5ppf 0.922" wt, 95KSI material | | | | | |
|---|---|---|---|---|---|
| load condition | tension [KN] | compression [KN] | internal pressure [MPa] | external pressure [MPa] | gas-tightness of connection |
| tension only | 10000 | 0 | 0 | 0 | OK |
| tension + internal pressure | 10000 | 0 | 80 | 0 | OK |
| internal pressure only | 0 | 0 | 100 | 0 | OK |
| compression + internal pressure | 0 | 7000 | 60 | 0 | OK |
| compression only | 0 | 7000 | 0 | 0 | OK |
| compression + external pressure | 0 | 7000 | 0 | 100 | OK |
| external pressure only | 0 | 0 | 0 | 100 | OK |

TABLE 2

Pipe: - 11¾" 106.7ppf 0.945" wt 125KSI material

| load condition | tension [KN] | compression [KN] | internal pressure [MPa] | external pressure [MPa] | gas-tightness of connection |
|---|---|---|---|---|---|
| tension only | 14000 | 0 | 0 | 0 | OK |
| tension + internal pressure | 14000 | 0 | 100 | 0 | OK |
| internal pressure only | 0 | 0 | 130 | 0 | OK |
| compression + internal pressure | 0 | 7000 | 70 | 0 | OK |
| compression only | 0 | 11000 | 0 | 0 | OK |
| compression + external pressure | 0 | 11000 | 0 | 120 | OK |
| external pressure only | 0 | 0 | 0 | 120 | OK |

It is known to those skilled in the art that several related variables influence the metal-to-metal seal performance, i.e.:
thread pitch,
thread taper,
sealing surfaces taper,
thread diametrical interference
diametrical interference of sealing surfaces
metal seal geometry While tightness of metal-to-metal seals may be improved by contact pressure (achieved by diametrical interference of both thread and metal seals), an excessive contact pressure leads to galling in the metal seals, if sliding distance is not reduced. Therefore, by increasing thread pitch, sliding distance may be reduced. Also, a low thread taper and a steeper seal taper may delay the seal contact for the end of the make-up. Moreover, the metal-to-metal seal geometry may also be beneficial, namely the toroidal to frusto-conical configuration reduces contact area while optimizing the contact pressure and sealing uniformity.

Thus, embodiments of the disclosed joints successfully passed all stages of the testing program according to ISO 13679 CAL IV and met all requirements and design targets set, and achieved optimum running performance and maximum structural capacity in extending the desired performance to the thick wall range.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A threaded joint for pipes, comprising:
a pin and a box;
the pin comprises:
at least one first end portion that includes a first end surface; and
a male threaded portion proximate the at least one first end portion, the box comprises:
at least one second end portion that includes a second end surface extending along a plane generally traverse to a longitudinal axis of the box, wherein the second end surface does not substantially face against any surface of the pin;
at least one dope expansion groove; and
a female threaded portion proximate the at least one second end portion;
the male and female threaded portions configured to mate at a thread taper;
wherein the pin comprises a first pin sealing surface on the first end portion in the vicinity of the first end surface on a first side of the male threaded portion and a second pin sealing surface proximate to a second side of the male threaded portion opposite to the first side of the male threaded portion;
wherein the box, on a first side of the female threaded portion, comprises a first box sealing surface and an abutment shoulder, configured to mate with the first pin end surface and having a second box sealing surface close to a second side of the female threaded portion opposite to the first side;
wherein the first pin sealing surface is configured to mate with the first box sealing surface to form an internal metal-to-metal seal and the second pin sealing surface is configured to mate with the second box sealing surface to form an external metal-to-metal seal, wherein the internal and external seals comprise the contact of one toroidal sealing surface with one frusto-conical sealing surface, and wherein the dope expansion groove is disposed axially between the internal and external metal-to-metal seals;
wherein nominal pipe wall thickness is greater than about 0.5 inches;
wherein the first box sealing surface has a different taper than the second pin sealing surface;
wherein the taper of the frusto-conical sealing surfaces of pin and box is greater than the thread taper; and
wherein an annular groove volume V in the mm scale of the at least one dope expansion groove comprises a unitless magnitude, the unitless magnitude of the volume being in the mm scale, that varies within the range $0.1*($a unitless magnitude of an outer diameter (OD), the unitless magnitude of the outer diameter being in the mm scale$)^2 < V < 0.5*($the unitless magnitude of the outer diameter, the unitless magnitude of the outer diameter being in the mm scale$)^2$, thus the unitless magnitude of V is within 10% and 50% of the unitless magnitude of the outer diameter when V and OD is in the mm scale, wherein V is proportional to OD.

2. A joint according to claim 1, wherein the male and female threaded portions comprise one or more hooked threads.

3. A joint according to claim 1, wherein said first pin end surface and said box abutment shoulder comprise a negative shoulder angle ($\alpha$).

4. A joint according to claim 1, wherein said internal metal-to-metal seal is made by the contact between a toroidal sealing surface on the pin and a frusto-conical sealing surface on the box.

5. A joint according to claim 1, wherein said external metal-to-metal seal is made by the contact between a frusto-conical sealing surface on the pin and a toroidal sealing surface on the box.

6. A joint according to claim 1, wherein the male and female threaded portions have less than about 5 threads per inch.

7. A joint according to claim 1, wherein nominal pipe wall thickness is greater than about 0.7 inches.

8. A joint according to claim 1, wherein the diameter of one of the toroidal sealing surfaces of pin and box is approximately 80 mm.

9. A joint according to claim 1, wherein root to crest contact is provided between box thread crest and pin thread roots.

10. A joint according to claim 1, wherein diametrical clearance is provided between box thread roots and pin thread crests.

11. A joint according to claim 1, wherein clearance is provided between stabbing flanks after make-up within the range from 0.01 mm to 0.12 mm when measured on a projection parallel to joint axis X.

12. A joint according to claim 1, wherein the thread stabbing flank angle is between 20° and 30°.

13. A joint according to claim 1, wherein the surface of the joint threaded portions has a dope-free surface treatment.

14. A joint according to claim 1, wherein the dope expansion groove is located proximate the abutment shoulder, the joint further comprising a second dope expansion groove located at the opposite end from the dope expansion groove located proximate the abutment shoulder.

15. A joint according to claim 1, wherein the toroidal seal surface has a radius between about 30 mm and about 100 mm.

16. A threaded joint for pipes, comprising:
a pin having a pin distal end with a first end surface and a male threaded portion on an outer radial surface of the pin proximate the distal end, a first pin sealing surface distal of the male threaded portion and a second pin sealing surface proximal of the male threaded surface;
a box configured to mate with the pin, the box having a box distal end with a second end surface and a female threaded portion on an inner radial surface of the box proximate the box distal end, a first box sealing surface located proximal of the female threaded portion and a second box sealing surface located distal of the female threaded surface, the female threaded portion and the male threaded portion mating at a thread taper; and
a dope expansion groove located proximate an abutment shoulder between the pin and box and sealed by the pin and box;
wherein the second end surface extends along a plane generally traverse to a longitudinal axis of the box and does not substantially face against any surface of the pin, and wherein the first pin sealing surface is configured to mate with the first box sealing surface to form an internal metal-to-metal seal and the second pin sealing surface is configured to mate with the second box sealing surface to form an external metal-to-metal seal, each of the internal and external seals comprising the contact of one toroidal surface with one frusto-conical sealing surface, wherein the toroidal surface has a radius between about 30 mm and about 100 mm;
wherein the taper of the frusto-conical sealing surfaces of the pin and box is greater than the thread taper; and
wherein an annular groove volume V in the mm scale of the at least one dope expansion groove comprises a unitless magnitude, the unitless magnitude of the volume being in the mm scale, that varies within the range $0.1*$(a unitless magnitude of an outer diameter (OD), the unitless magnitude of the outer diameter being in the mm scale$)^2 < V < 0.5*$(the unitless magnitude of the outer diameter, the unitless magnitude of the outer diameter being in the mm scale$)^2$, thus the unitless magnitude of V is within 10% and 50% of the unitless magnitude of the outer diameter when V and OD is in the mm scale, wherein V is proportional to OD.

17. The joint of claim 16, wherein the first pin sealing surface comprises a toroidal surface and the first box sealing surface comprises a frusto-conical surface.

18. The joint of claim 16, wherein the second pin sealing surface comprises a frusto-conical surface and the second box sealing surface comprises a toroidal surface.

19. The joint according to claim 16, wherein the radius is about 80 mm.

20. The joint according to claim 16, wherein the toroidal sealing surface is located on a less rigid member than the frusto-conical sealing surface.

21. The joint according to claim 16, wherein the first box sealing surface has a different taper than the second pin sealing surface.

* * * * *